Figure 3:
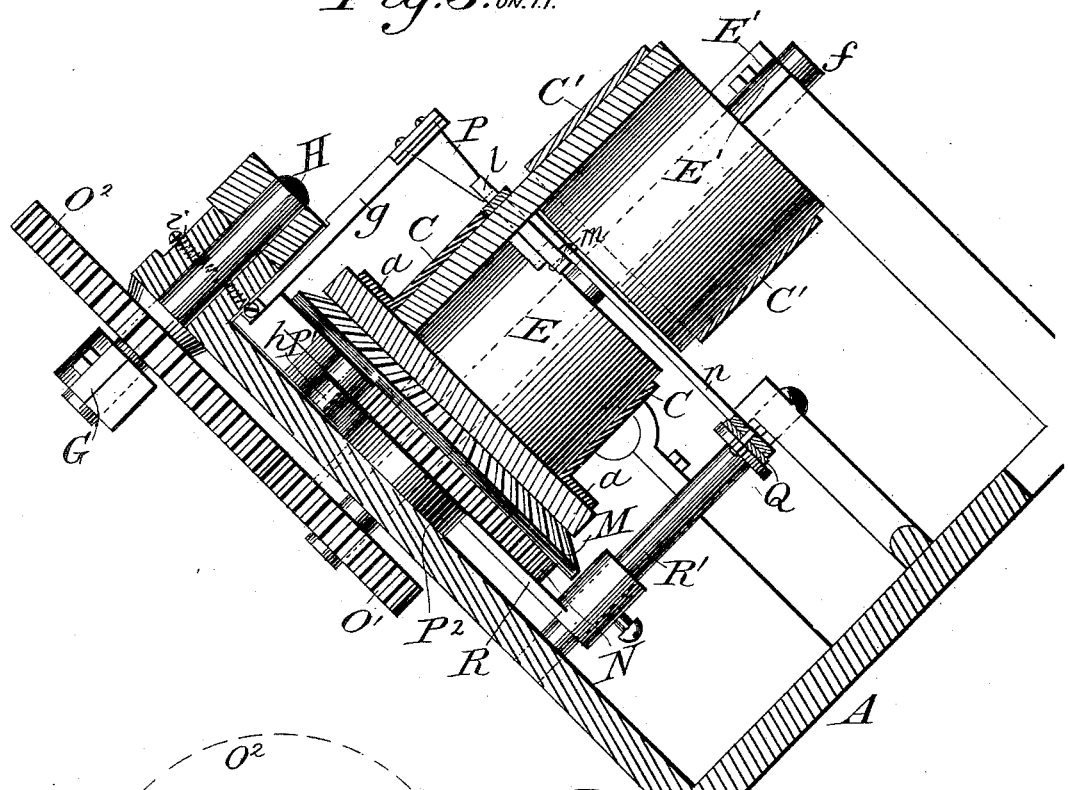

(No Model.) 7 Sheets—Sheet 1.
M. V. B. ETHRIDGE.
STAMP CANCELING AND POSTMARKING MACHINE.
No. 467,762. Patented Jan. 26, 1892.
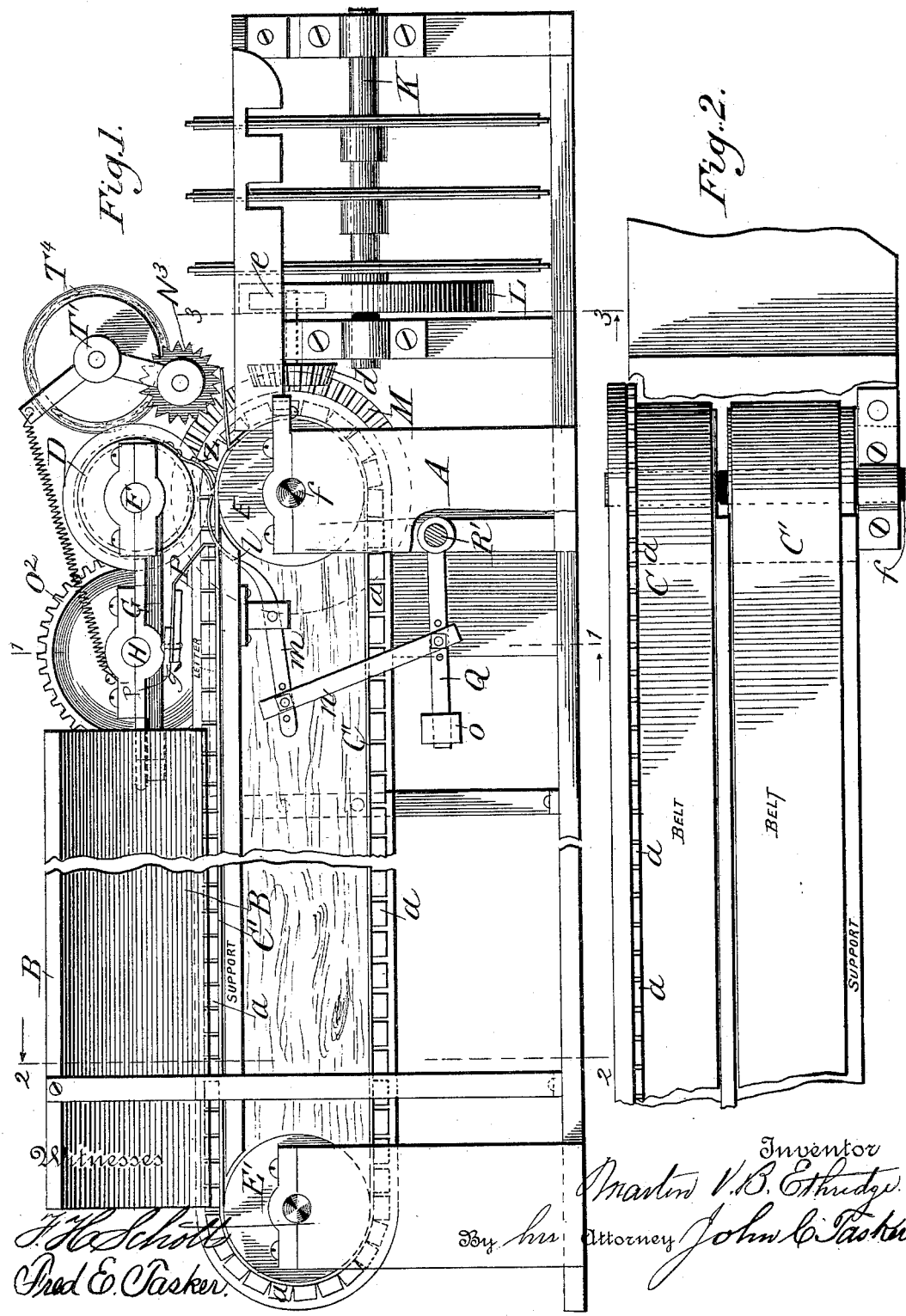

(No Model.) 7 Sheets—Sheet 2.

M. V. B. ETHRIDGE.
STAMP CANCELING AND POSTMARKING MACHINE.

No. 467,762. Patented Jan. 26, 1892.

Witnesses
F. H. Schott
Fred E. Tasker

Inventor
Martin V. B. Ethridge
By his Attorney John C. Tasker (No Model.) 7 Sheets—Sheet 3.

M. V. B. ETHRIDGE.
STAMP CANCELING AND POSTMARKING MACHINE.

No. 467,762. Patented Jan. 26, 1892.

Witnesses
F. H. Schott
Fred E. Tasker

Inventor
Martin V. B. Ethridge
By his Attorney John C. Tasker (No Model.) 7 Sheets—Sheet 4.
M. V. B. ETHRIDGE.
STAMP CANCELING AND POSTMARKING MACHINE.

No. 467,762. Patented Jan. 26, 1892.

Witnesses
F. H. Schott
Fred E. Tasker

Inventor
Martin V. B. Ethridge
By his Attorney
John C. Tasker (No Model.)  7 Sheets—Sheet 5.
M. V. B. ETHRIDGE.
STAMP CANCELING AND POSTMARKING MACHINE.

No. 467,762.  Patented Jan. 26, 1892.

Witnesses
F. H. Schott
Fred E. Tasker.

Inventor
Martin V. B. Ethridge
By his Attorney John C. Tasker

THE NORRIS PETERS CO., PHOTO-LITHO., WASHINGTON, D. C.

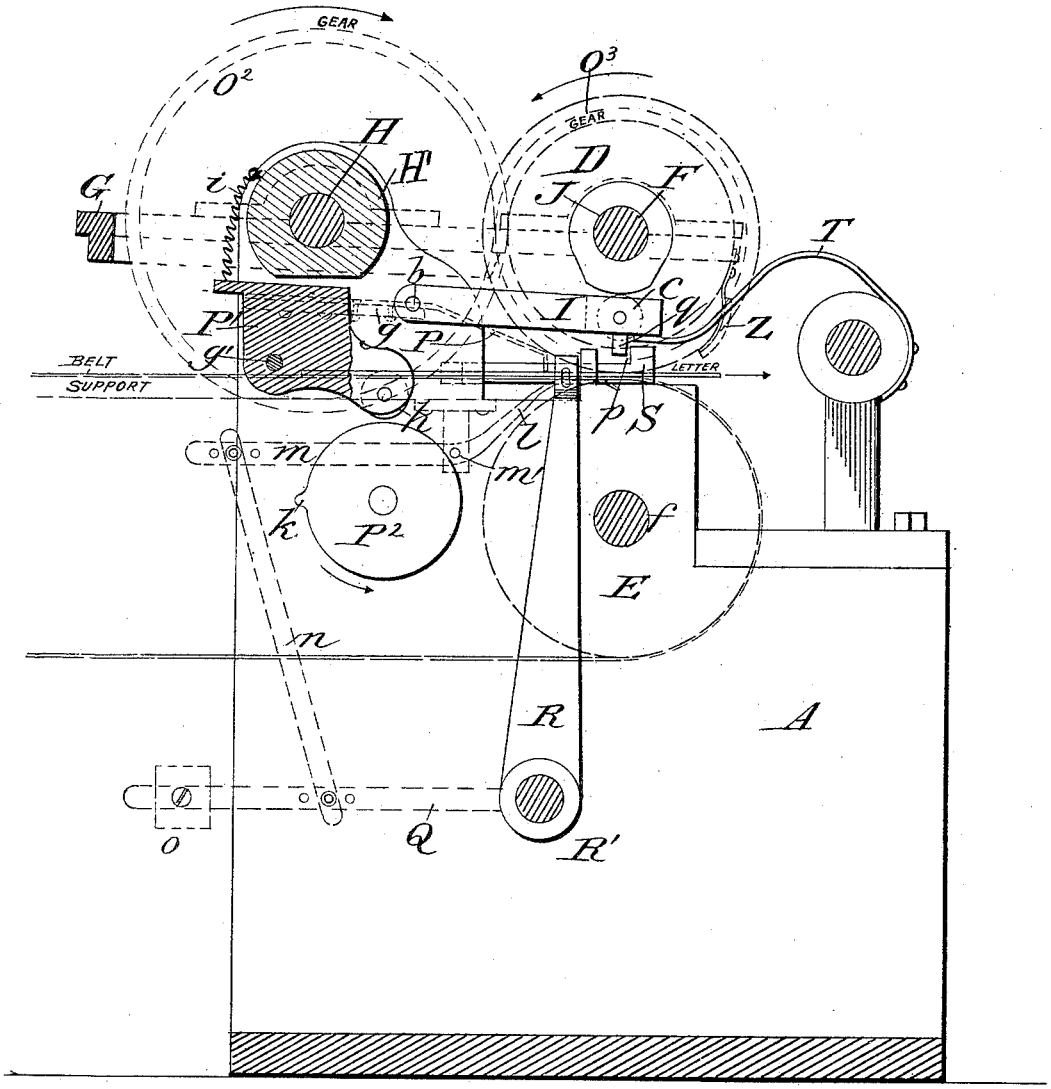

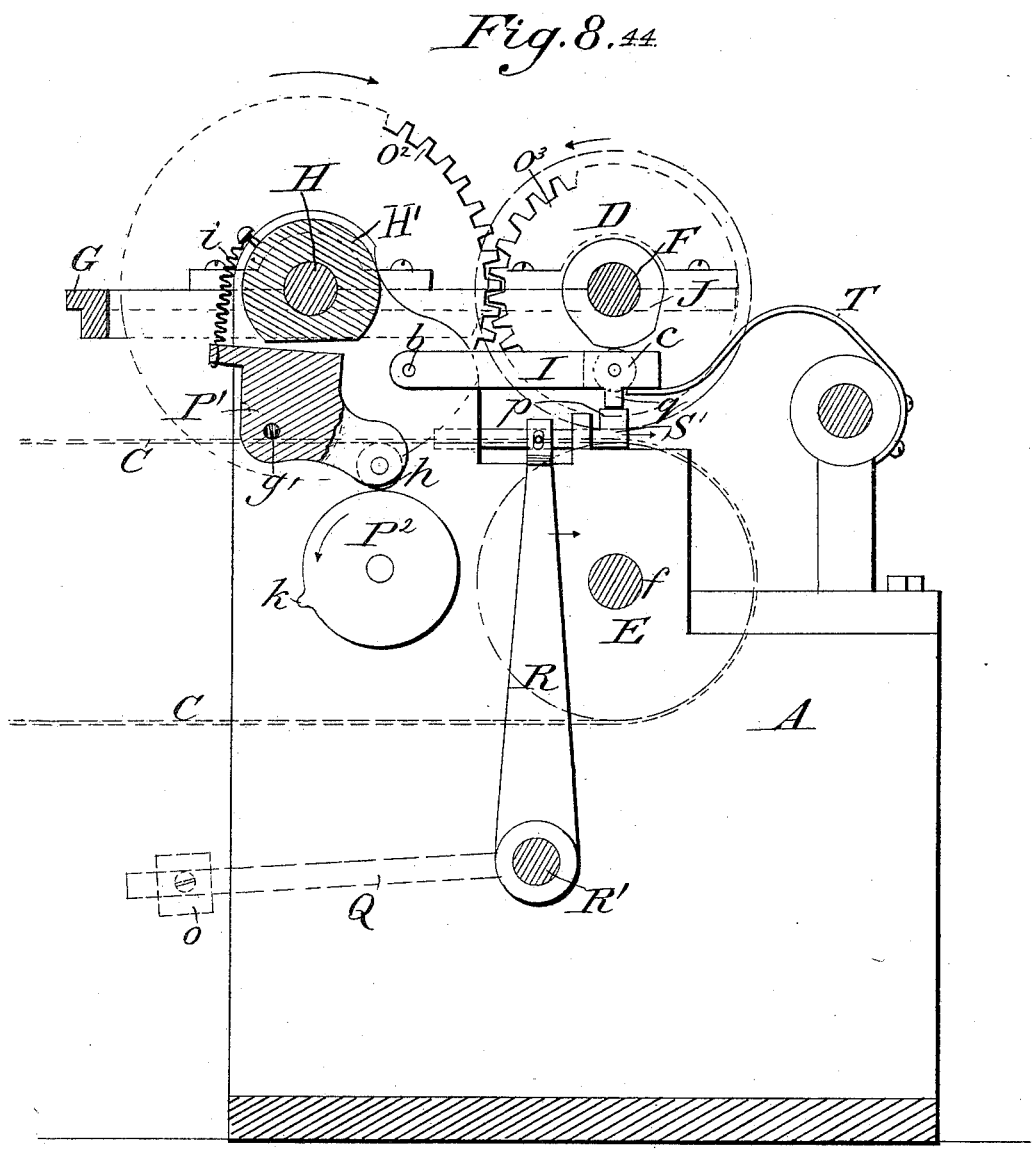

UNITED STATES PATENT OFFICE.

MARTIN V. B. ETHRIDGE, OF BOSTON, MASSACHUSETTS, ASSIGNOR TO THE AMERICAN POSTAL MACHINES COMPANY, OF PORTLAND, MAINE.

STAMP-CANCELING AND POSTMARKING MACHINE.

SPECIFICATION forming part of Letters Patent No. 467,762, dated January 26, 1892.

Application filed April 9, 1888. Serial No. 270,071. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Stamp-Canceling and Postmarking Machines; and I do hereby declare the following to be a full, clear, and exact description of the invention, such as will enable others skilled in the art to which it appertains to make and use the same.

This invention has reference to machines for stamp-canceling and postmaking letters, cards, newspapers, and other pieces of mail-matter and delivering the same for sorting and distribution to the mails by one continuous series of appropriate mechanical operations.

The invention consists, essentially, in a stamp or marker which continuously revolves in close proximity to the feed-belt, but so arranged as not to ink or soil it, said stamp or marker being controlled and operated by suitable regulating mechanism that is set in motion separately by each individual piece of mail-matter passing through the machine, and said stamp or marker being combined with certain other mechanical parts or devices, which jointly operate in the machine to secure an accurate registry of the postmarking and stamp-canceling impressions at the proper points on each and every piece of mail-matter as it passes between the printing-stamp and the feed-belt, and the invention also embraces certain details in the construction, arrangement, and combination of parts, as will be hereinafter described and claimed.

The moving support which conveys the letters, cards, or other pieces of mail-matter to the stamp-canceling and postmarking mechanism consists, preferably, of a feeding bed or belt, which in like manner with the accompanying mechanism is located in an inclined position, as shown in Fig. 3. However, for convenience in illustration, all of said parts will, with certain exceptions, be found depicted throughout the various figures of the drawings and likewise mentioned in the preliminary description of these figures as if the said bed and its accompaniments were in a horizontal position.

Figure 9:
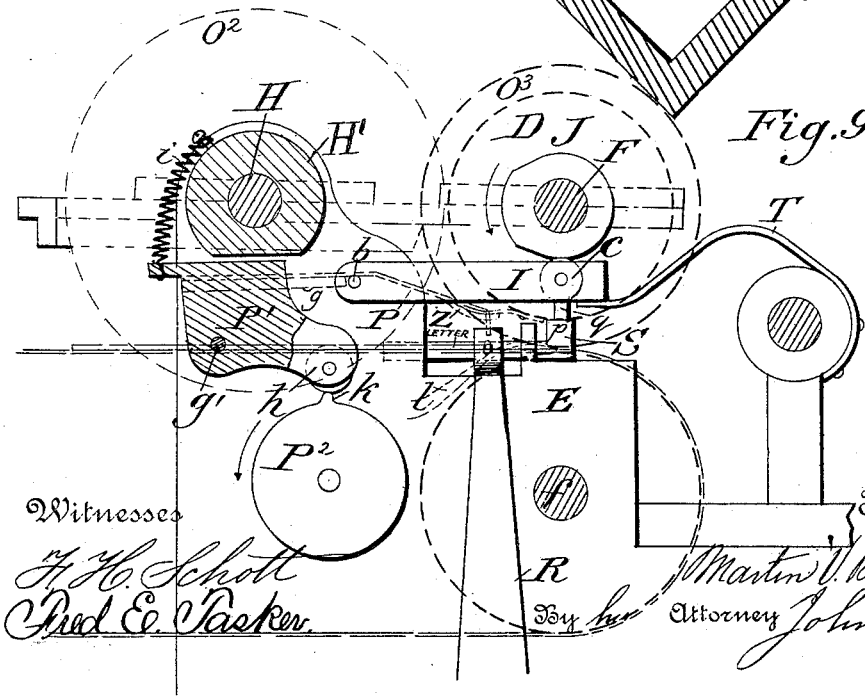
Figure 4:
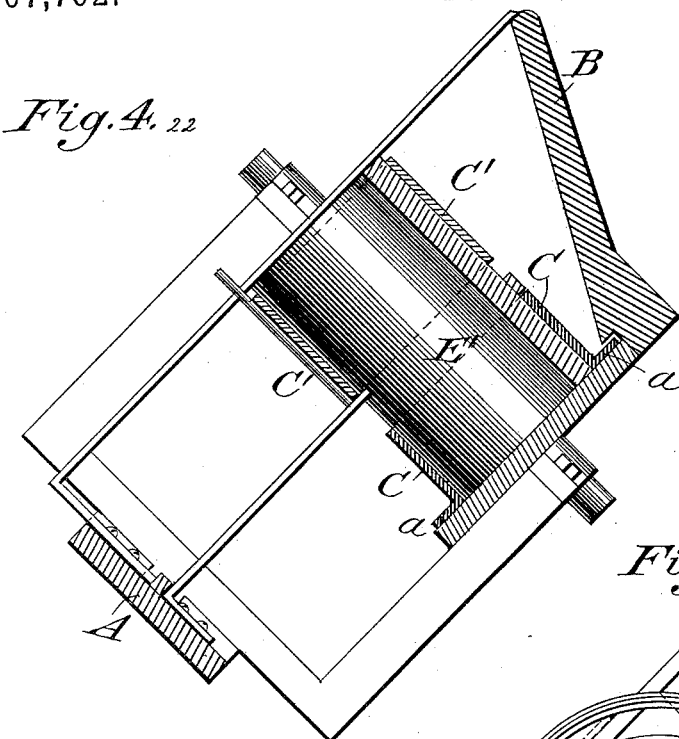
Figure 11:
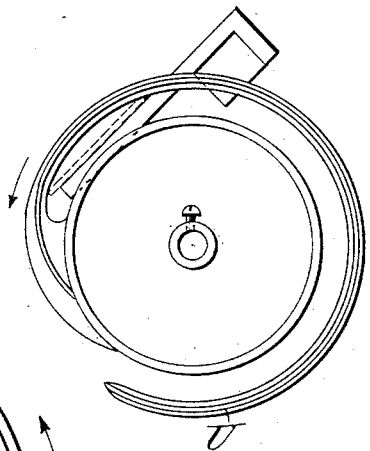
Figure 10:
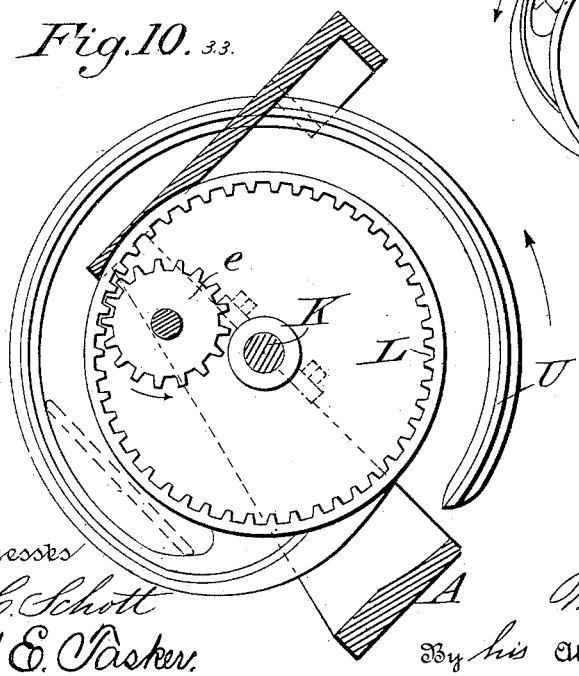
Figure 5:
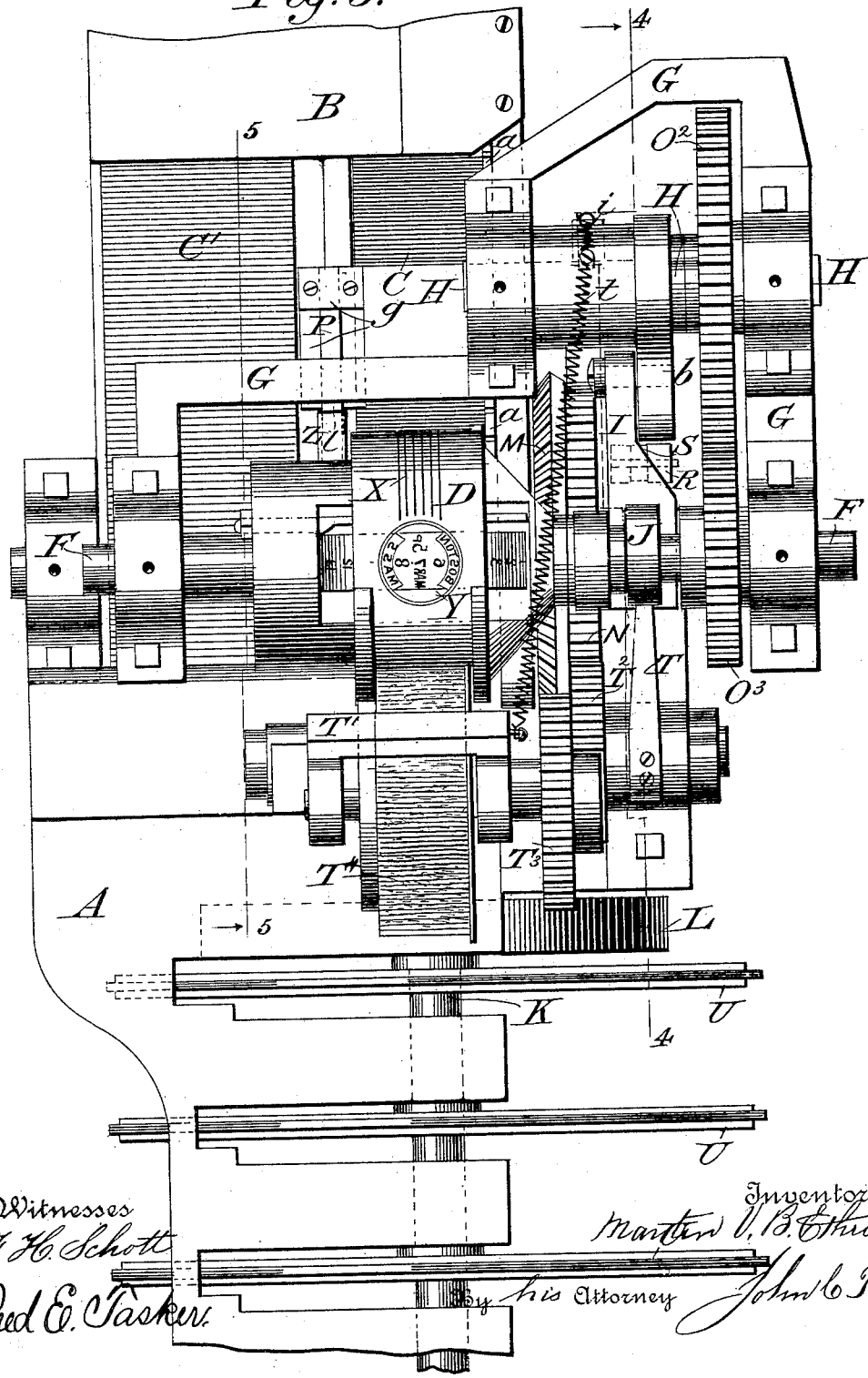
Figure 6:
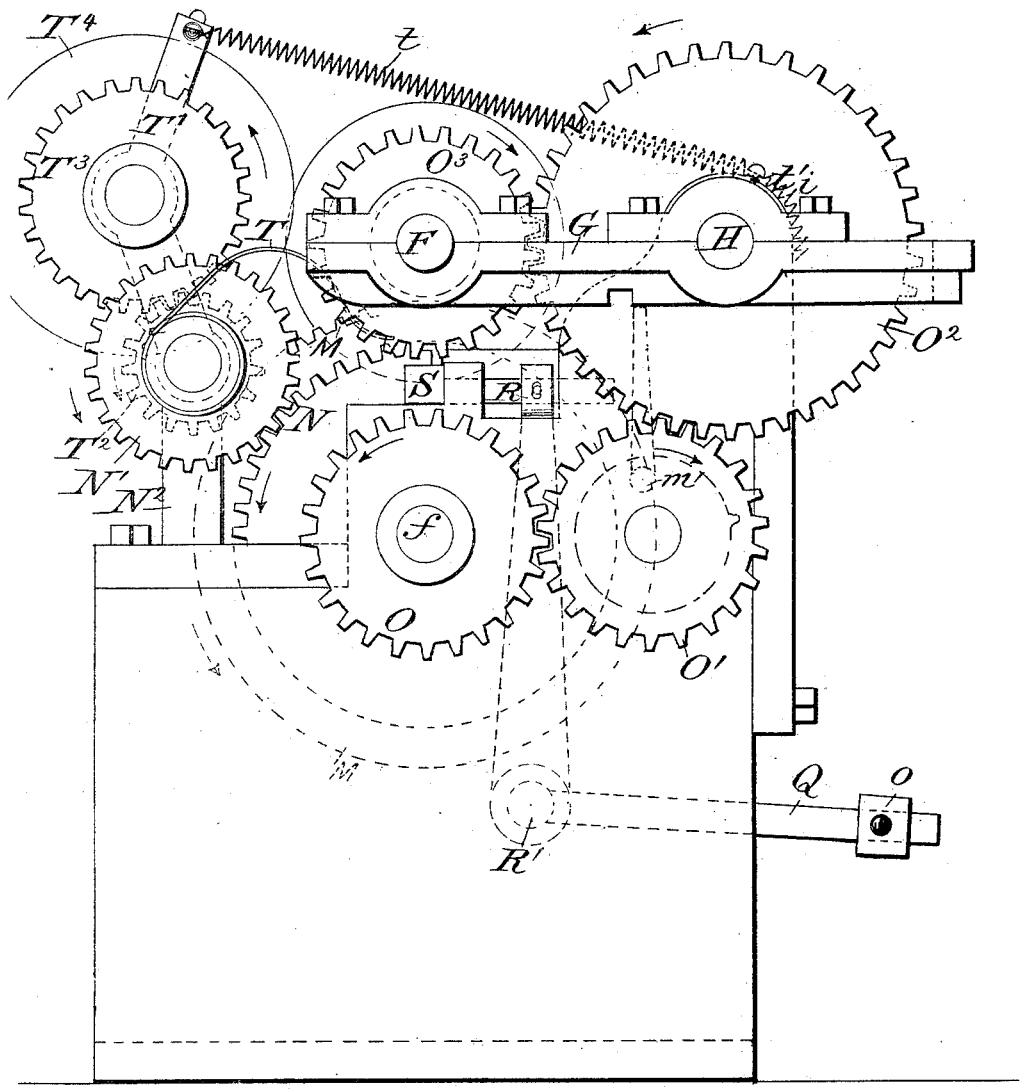

In the annexed drawings, Figure 1 is a rear side elevation of my improved stamp-canceling and postmarking apparatus in partial section. Fig. 2 is a top plan view of the moving letter-support or feed-belt, the printing mechanism being removed. Fig. 3 is a transverse section on the line 1 1 of Fig. 1. Fig. 4 is a transverse section on the line 2 2 of Fig. 1. Fig. 5 is a top plan view of the entire apparatus with the exception of a part of the feed-belt. Fig. 6 is a front side elevation of the gearing which is arranged to actuate the feed-belt, printing-cylinder, inking-roller, &c. Fig. 7 is a vertical section on the line 4 4 of Fig. 5, looking from the rear of the machine and showing the printing-cylinder, its elevating-cam, the rocker-arm, and certain other parts of the neighboring mechanism in the position that they are caused to assume when a piece of mail-matter is between the printing-roller and the bed and undergoing the operation of being marked. Fig. 8 is a similar view on the section-line 4 4 of Fig. 5, showing the printing-cylinder, its elevating-cam, the rocker-arm, &c., in the position that they occupy when the marking-dies on the printing-roller are directly opposite the feeding-belt and no mail-matter passing. Fig. 9 is a diagrammatic view of the same parts shown in Figs. 7 and 8 and indicates the position that the printing-roller normally occupies as it revolves continuously in close proximity to the belt, said position being constantly maintained by the printing-roller, except when it is elevated in the manner shown in Fig. 8 to prevent the marking-die from soiling the belt when mail-matter is not passing. In Figs. 7, 8, and 9 several of the parts of the machine which would not otherwise appear in the sections which these figures are intended to illustrate are shown in dotted lines diagrammatically, so as to illustrate more clearly the relation of all the parts of the machine. Fig. 10 is a transverse section on the line 3 3 of Fig. 1. Fig. 11 is a detail side view of one of the packing-cams.

Similar letters of reference designate corresponding parts throughout all the different figures of the drawings.

The various mechanical devices which constitute this machine are mounted or carried in any suitable and desirable frame-work that comports with their structure, arrangement, and function. This frame-work is herein designated in general by A.

Preferably secured upon the frame of the machine is an inclined hopper B, into which the letters are placed singly, or one after another, so as to rest upon an inclined moving support, which in the present example of my invention consists of a pair of bands or traveling belts C C', that form an angle with the inclined front of the hopper B. (See Figs. 1 and 4.) By means of this inclined moving support the letters are automatically adjusted and conveyed to the postmarking and stamp-canceling mechanism, to be hereinafter described, in such a manner as to insure a clear and distinct impression of the postmarking and stamp-canceling dies at the proper points upon the package or its envelope, after which it is delivered to the action of devices by which it is propelled to the sorting-table. The traveling bands, which in the present apparatus are preferably used to constitute the moving letter-support, are mounted on rollers E E', whose shafts are journaled in the frame in the inclined position shown. One of said rollers, as E, is preferably located beneath the postmarking and stamp-canceling cylinder D and serves as a pressure-roller as well as a band-carrying roller or driver. It will be generally found most convenient to provide the lower or forward inclined band C with a series of projections or shoulders $a$ $a$ along its lower edge, by which the letters or cards are adjusted and supported in a uniform position or alignment.

An oscillating rocker-frame G or carrier for the printing-roller overhangs the moving letter-bed in a position substantially parallel thereto and supports the printing-cylinder D, secured on a transverse shaft F, that is journaled in suitable boxes on the frame G, said printing-cylinder being so situated as to be directly above the impression-roll E and to revolve quite or nearly in contact with the feed-belt. The roller-frame G is fulcrumed upon a suitable transverse shaft H, which is journaled at each end in said frame G and is carried by lugs H' on the main frame of the machine, as shown in Figs. 5, 7, and 8. A horizontal rocker-arm I is fulcrumed by suitable means at $b$ upon the rigid supporting-standard that serves to uphold the rocker-frame G. (See Figs. 5 and 8.) Said rocker-arm I extends to a point underneath the shaft F, where it is furnished with a roller $c$, journaled therein. The shaft F carries a cam J, rigidly secured upon it directly above the roller $c$, so that the cam may be in contact with the roller. A curved spring T bears against the under side of the roller-carrying end of the rocker-arm I and holds said arm so that the roll may be in contact with the cam at all times. Said curved spring is fastened to some suitable part of the machine. I do not confine myself to any special form of spring, and take the spring T by way of example only to show one way of upholding the rocker-arm so that it may be in contact with the cam. Supposing the arm I during the rotation of the roller-shaft to be held immovably in a horizontal position with its roll against the cam J, it is obvious that at one point in each rotation the shaft and the attached printing-roller or marker will be elevated for a moment above their usual level. This momentary elevation of the marker takes place when the canceling and postmarking dies are nearest the feed-belt and no letter is passing, lest otherwise the feed-belt might be soiled.

It will be noticed that the spring T does not afford such a support for the rocker-arm as to hold it immovably in a horizontal position. The spring T holds the rocker-arm yieldingly. It is held at times immovably by means of other devices which operate beneath it and which will be hereinafter fully described.

The mechanism for imparting motion to the printing-cylinder, the conveying feed-belt for the letters, and the other parts of my improved stamp-canceling and postmarking apparatus are as follows: A horizontal shaft K (see Figs. 1 and 5) is driven by a connection with any convenient driving-power. This shaft carries near its inner end a band-wheel L, which is internally cogged, as shown in Fig. 10, to engage a pinion $e$ on a short shaft that carries at its other end a bevel-pinion $d$ for meshing with a large bevel-gear M, secured on the shaft $f$ of the driving or impression roll E. The shaft $f$ is likewise provided with a gear N and a gear O. (See Fig. 6.) The gear N meshes with the gear N' on a shaft journaled in a standard $N^2$ on the frame, and which communicates motion to the toothed rubber wheel $N^3$, (see Fig. 1,) that catches the letter after it has been postmarked and pushes it forward to the packing and sorting devices. The gear O engages an intermediate gear O', that meshes with the gear $O^2$ on the rocker-frame shaft H, which gear $O^2$ in turn communicates motion to the gear-wheel $O^3$ on the roller-shaft F. Thus the conveying-belts, the marking-cylinder, and other parts receive motion simultaneously.

In order that a letter, card, newspaper, or similar piece or package of mail-matter which is being conveyed by the traveling belts may be delivered at the proper moment to the stamp-canceling and postmarking dies for the purpose of being printed thereby, I provide a timing lever or stop, as P, which extends into the letter-path above the traveling belts and in close proximity to their surface and at a point slightly in advance of the printing-roller or other marking device, said lever being so arranged as to oppose the further passage of the letter or other piece of mail-matter and cause it to be detained in its progress until the rotation of the type-cylinder has brought the stamp-canceling and postmarking device nearly to the point where their impression is to be made, at which time the lever P is automatically removed from the letter-path, and the letter is allowed to pass beneath the printing-roller and be printed. Said lever P is secured to an oscillatory plate $g$, (see Figs. 1 and 7, where it is shown as riveted,) carried by an arm P', pivoted at $g'$ to the frame of the machine, below the shaft H, and provided at its lower end with a roller $h$. (See Figs. 7 and 8.) The roller $h$ bears against a roller $P^2$, journaled in the frame and receiving motion from the driver or impression-roll E. A spring $i$, fastened upon the arm P', but also upon the frame G, keeps the roller $h$ constantly against the roller $P^2$. The roller $P^2$ is provided at a certain point on its periphery with a small lug or projection $k$. Obviously, therefore, each time during the revolutions of the roller $P^2$ that the lug $k$ comes into contact with the roller $h$ the arm P' will be lifted, and the timing-stop P will in consequence be momentarily elevated out of the letter-path.

The printing-roller, the impression-roller, and the roll $P^2$ and the other adjacent parts of the mechanism are so arranged relatively to each other as to operate in such a manner that each momentary elevation of the timing-stop P will take place at the point of time when the stamp-canceling and postmarking dies are approaching that position where they will be opposite to the letter-conveying belt. A controlling-lever $l$, or, as it may be termed, a "trigger" or "barrier," in the letter-path projects upward between the traveling belts C C' and beneath the postmarking-cylinder, with which it connects by means of suitable intermediate mechanism—an example of which will be hereinafter described—said lever being thus arranged to act in association with each individual piece of passing mail-matter to cause the printing-roller to print upon said piece of passing mail-matter, for it has already been seen that when mail-matter is not passing, the printing-roller will be removed from proximity to the belt whenever its cancellation-dies come nearest the latter, thus avoiding the soiling of the belt. This controlling-lever $l$ is depressed by the letter or other article when it begins to pass beneath the printing-cylinder.

It has already been seen that the printing-cylinder revolves continuously in contact with the belt or in very close proximity thereto, and that the belt escapes being inked, when a stamp comes nearest it, by the intermittent momentary elevation of the stamp at that instant through the action of the cam J upon the roller $c$ in the rocker-arm, which rocker-arm is for the time being upheld rigidly by a support beneath it. It is evident, therefore, that in order to stamp, cancel, and postmark a passing letter, some means must be devised whereby the contact of the cylinder with the belt may be maintained during the passage of the letter—that is to say, whereby the elevating effect of the cam J on the printing-roller may be counteracted—and clearly the easiest mode of doing this is to remove the support from beneath the rocker-arm I, that carries the roller $c$, so that the cam may not act to lift the cylinder off the belt. The purpose, therefore, of the lever $l$ is to act in association with the letter to remove the support from beneath the rocker-arm I, and this it accomplishes through the agency of the intervening mechanism between the controlling-lever and said rocker-arm.

I do not wish in this case to confine myself to any particular combination and arrangement of the intervening devices which connect the controlling-lever with the rocker-arm, but reserve the liberty of substituting for those that are herein explained all the mechanical equivalents which may readily occur to persons skilled in the art to which my invention appertains. In the example of mechanism for enabling the controlling-lever to regulate the position of the rocker-arm, and consequently of the printing-roller which I have chosen to represent in the drawings and to describe in the specification, the lever $l$ is attached to a lever $m$, fulcrumed by means of a pivot at $m'$ upon a portion of the machine-frame. (See Figs. 1 and 7.) The lever $m$ is connected by a link $n$ with an arm Q, rigidly fastened to a rock-shaft R', said arm Q being weighted at its upper end $o$. Upon the rock-shaft R' is secured a vertical rock-lever R, which is loosely connected by a pivot or otherwise near its upper end with a horizontal sliding block S, located just below the arm I and having its upper face rabbeted or grooved at $p$. The arm I is provided on its under side with a downwardly-projecting lug $q$, which, when the block S is in its normal or ordinary position, will rest almost upon said block, and would rest close upon it but for the spring T. The block at this time affords a firm and unyielding support for the rocker-arm I, so that at each revolution of the printing-roller said roller is elevated by the cam. When the block slides outward, however, the lug $q$ will drop off the upper surface of the block into the rabbet $p$, thus causing the roller-carrying end of the rocker-arm to be lowered. The block S is arranged to slide in suitable guides, which direct its movement and limit it. Now, as the controlling-lever $l$ is depressed the sliding block will be moved endwise sufficiently far to allow the lug $q$ to be opposite the rabbet $p$, and hence when the cam bears upon the roller in the rocker-arm said arm will be depressed, overcoming the tension of the spring T, and the lug $q$ will enter the rabbet $p$. The printing-roller is therefore prevented from rising off the belt and the mail-matter will be printed. When the letter has passed, the weighted arm Q will return the lever $l$ to its former position in the letter-path, while the spring T will raise the arm I, so that the sliding block S may again freely pass beneath the arm I and be in readiness to enable said arm to oppose the pressure of the cam and thus cause the marking-roller to be elevated should said marking-roller at its next rotation find no piece of mail-matter between it and the letter-conveying belt.

The printing cylinder or roller D, which is secured on the shaft F, is provided with any suitable stamp-canceling die X and any suitable postmarking-die Y, (see Fig. 5,) and also with a projecting foot Z, which bears on the letter as soon as it has passed the timing-stop P and come into contact with the controlling-lever $l$, and thus assists it to depress the controlling-lever and draws it forward beneath the marking-roller.

It will be noted in the example of mechanism herein described that the printing device or marking arrangement which cancels and postmarks the letter is carried by a revolving cylinder; but it is not my purpose to limit myself to a single mode of oscillating the marker by attaching it to a rotary support.

The invention as I conceive it may be thus broadly stated—namely, that an oscillating marker is hung over the letter-conveying belts in such a way that when no letter passes it will be in close proximity to the belt without soiling it, but when a letter does pass it will be marked, and the letter itself is the agency that by coming into association with the lever in the letter-path controls the action of the marking device.

$T^4$ denotes an inking-roller. I have shown this inking-roller here, by way of example, only as one form of inking device that might be employed. It is journaled in a rocker-arm T', pivoted in the standard $N^2$ and so held by means of a connecting-spring $t$ between its upper end and a suitable point, as $t'$, on the frame G that the inking roller or pad may bear with a constant even pressure against the printing-roller. A rotary motion is imparted to the inking-roller by having a gear-wheel $T^3$ secured on the roller-shaft, that meshes with a pinion $T^2$ on the same shaft as gear N', that engages and receives motion from the gear N on the same shaft $f$ which carries the impression-roll E, and the gear O, which forms a part of the chain of gearing whereby the printing-roller is actuated.

The cams U U on the horizontal shaft K are used for packing the letters after they have been postmarked and stamp-canceled. These cams are each composed of a rigid segmental stock or body, from which springs a curved elastic finger, and said cams pass through slots in the inclined tray or table, upon which the letters, cards, and other pieces of postmarked and canceled mail-matter are successively delivered from the stamp-canceling mechanism in any inclined edgewise position. As these pieces of mail-matter are placed within the space inclosed by the cam-fingers they are caught by these fingers in season to be propelled and packed by the stocks or bodies of the cam in an upright position, and thus uniformly packed and steadily propelled forward continuously to the sorting-table for distribution to outgoing mails.

Having thus described my invention, what I claim as new, and desire to secure by Letters Patent, is—

1. In a stamp-canceling and postmarking apparatus, the combination of a printing-roller journaled in an oscillating frame, a cam on the roller-shaft, a rocker-arm beneath the cam, a sliding support beneath the rocker-arm, a traveling belt, an impression-roll, a lever in the letter-path, and the connecting devices between it and the sliding support, whereby the sliding support is removed from the rocker-arm whenever a letter passes, so as to prevent the cam from elevating the printing-roller and permit in consequence a registry of the cancellation and postmark upon said letter, substantially as described.

2. In a stamp-canceling and postmarking apparatus, the combination of the oscillating frame, the printing-roller carried thereby, a cam on the roller-shaft, a rocker-arm beneath the cam, a sliding support for the rocker-arm, an impression-roller, a controlling-lever in the letter-path, a weighted arm secured to a rock-shaft carrying a rock-lever loosely connected to the sliding support, and a link connection between said weighted arm and the controlling-lever, all arranged to operate substantially as described.

3. In a stamp-canceling and postmarking machine, the combination of the printing-roller, the rocker-frame I, the curved spring T, the rabbeted sliding block S beneath the rocker-frame, the rock-shaft R', with its rock-lever R, loosely connected to the sliding block, the controlling-lever $l$ in the letter-path, the weighted arm Q, attached to the shaft R', and the rods $m$ and $n$ between the weighted lever and the controlling-lever, substantially as described.

In testimony whereof I affix my signature in presence of two witnesses.

MARTIN V. B. ETHRIDGE.

Witnesses:
 THOMAS M. BABSON,
 FISHER AMES.